(12) United States Patent
Shu

(10) Patent No.: US 7,545,307 B2
(45) Date of Patent: Jun. 9, 2009

(54) TARGET RECOGNITION SYSTEM AND METHOD WITH UNKNOWN TARGET REJECTION

(75) Inventor: David B. Shu, Canoga Park, CA (US)

(73) Assignee: Raytheon Company, Waltham, MA (US)

( * ) Notice: Subject to any disclaimer, the term of this patent is extended or adjusted under 35 U.S.C. 154(b) by 126 days.

(21) Appl. No.: 11/304,022

(22) Filed: Dec. 15, 2005

(65) Prior Publication Data
US 2007/0139251 A1 Jun. 21, 2007

(51) Int. Cl.
G01S 7/41 (2006.01)
G01S 13/90 (2006.01)

(52) U.S. Cl. .................. 342/25 A; 342/25 R; 342/90

(58) Field of Classification Search ............. 342/74–81, 342/25 A
See application file for complete search history.

(56) References Cited

U.S. PATENT DOCUMENTS

| | | | | |
|---|---|---|---|---|
| 5,319,779 A * | 6/1994 | Chang et al. | ..................... | 707/3 |
| 5,351,310 A * | 9/1994 | Califano et al. | ............. | 382/199 |
| 5,392,050 A * | 2/1995 | Guerci et al. | ................. | 342/90 |
| 5,479,255 A * | 12/1995 | Denny et al. | ................. | 356/319 |
| 5,497,158 A * | 3/1996 | Schmid et al. | ................ | 342/90 |
| 5,828,769 A * | 10/1998 | Burns | ........................ | 382/118 |
| 5,835,682 A * | 11/1998 | Broomhead et al. | ........... | 706/14 |
| 5,864,779 A * | 1/1999 | Fujimoto | .................... | 702/179 |
| 6,108,437 A * | 8/2000 | Lin | ............................. | 382/118 |
| 6,259,396 B1 * | 7/2001 | Pham et al. | ................... | 342/90 |
| 6,337,654 B1 * | 1/2002 | Richardson et al. | ........... | 342/90 |
| 6,807,286 B1 * | 10/2004 | Krumm et al. | .............. | 382/103 |
| 6,897,802 B1 * | 5/2005 | Daniell et al. | ................. | 342/90 |
| 6,968,073 B1 * | 11/2005 | O'Boyle et al. | ............. | 382/104 |
| 7,015,855 B1 * | 3/2006 | Medl et al. | ................ | 342/25 A |
| 7,089,009 B1 * | 8/2006 | Fauconnier | ................. | 455/445 |
| 7,116,265 B2 * | 10/2006 | Shu et al. | .................. | 342/25 R |
| 2001/0038713 A1 * | 11/2001 | Kitagawa et al. | ............ | 382/209 |
| 2002/0181780 A1 * | 12/2002 | Simon et al. | ................ | 382/209 |
| 2003/0128876 A1 * | 7/2003 | Yamaguchi | .................. | 382/190 |
| 2003/0185436 A1 * | 10/2003 | Smith | ......................... | 382/159 |
| 2004/0054499 A1 * | 3/2004 | Starzyk et al. | .............. | 702/182 |

(Continued)

OTHER PUBLICATIONS

Barbosa et al. "Linear Algebra Algorithms in a Heterogeneous Cluster of Personal Computers". Heterogeneous Computing Workshop, 2000 Proceedings. May 1, 2000. pp. 147-159.*

(Continued)

*Primary Examiner*—Thomas H Tarcza
*Assistant Examiner*—Matthew M Barker
(74) *Attorney, Agent, or Firm*—Leonard A. Alkov, Esq.

(57) ABSTRACT

The present invention describes a new QR enclosing voting scheme that allows the extraction of base signatures of objects using a shortest path QR algorithm, providing a probability distribution measuring the occurrence of each random projection base of the object under consideration. The method is very effective in extracting the overall base signatures of a given class of objects. The novelty of this approach is that it is not tailored to the nature of the objects, thus generally applicable, and unmanned. Random projections (RP) have been a powerful tool to reduce the dimensionality of an object while preserving class separation. The inventive voting scheme, after RP, further reduces the dimensionality to no more than the number of the training objects.

38 Claims, 7 Drawing Sheets

U.S. PATENT DOCUMENTS

| | | | |
|---|---|---|---|
| 2005/0143640 A1* | 6/2005 | Hoctor et al. | 600/407 |
| 2005/0265605 A1* | 12/2005 | Nakamoto et al. | 382/209 |
| 2006/0176209 A1* | 8/2006 | Shu et al. | 342/25 R |
| 2007/0058836 A1* | 3/2007 | Boregowda et al. | 382/103 |

OTHER PUBLICATIONS

Dimitris Achlipotas, "Database-friendly Random Projections,", Symposium on Principles of Database Systems, pp. 274-281 (2001).

E. Bingham and H. Mannila, "Random Projection In Dimensionality Reduction: Applications to Image and Text Data", Knowledge Discovery and Data Mining, pp. 245-250 (2001).

Sanjoy Dasgupta, "Experiments with Random Projection," Proceedings of the 16th Conference on Uncertainty in Artificial Intelligence, p. 143-151, Jun. 30, 2000.

* cited by examiner

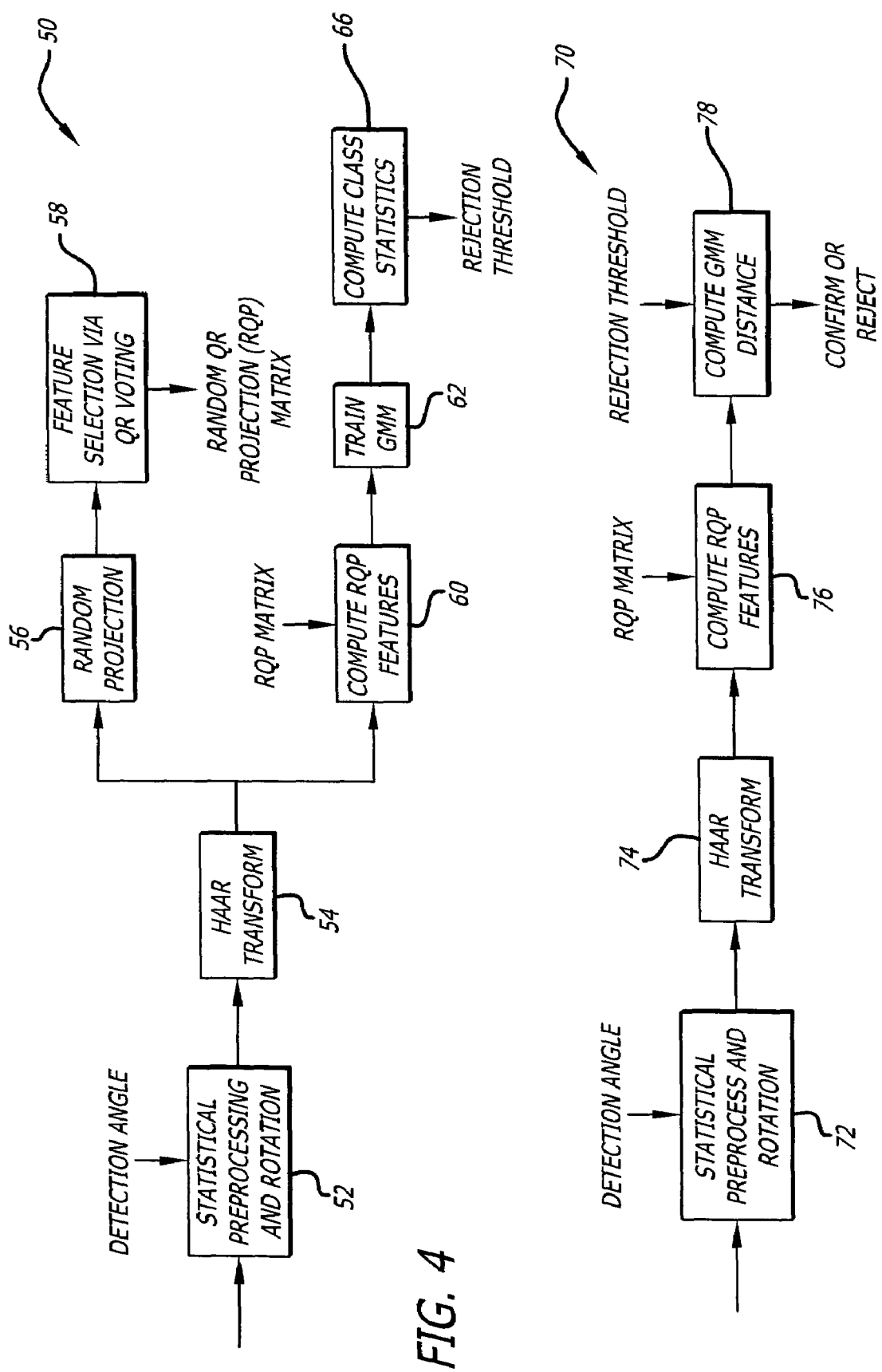

$$\overset{n \times q}{(A)} = \overset{n \times p}{(X)} * \overset{p \times q}{(J_{RP})}$$

WHERE $q \times p$ $$J_{RP}^{T} = \begin{pmatrix} 1 \, \text{-}1 \, \text{-}1 \, \text{-}1 \, 1 \, 1 \, \text{-}1 \, 1 \, 1 \, \text{-}1 \, \text{-}1 \, \text{-}1 \, 1 \, 1 \, 1 \, 1 \, \text{-}1 \, 1 \\ \text{-}1 \, 1 \, \text{-}1 \, \text{-}1 \, 1 \, 1 \, \text{-}1 \, 1 \, \text{-}1 \, 1 \, 1 \, 1 \, \text{-}1 \, 1 \, 1 \, \text{-}1 \, 1 \, 1 \\ \text{-}1 \, 1 \, 1 \, \text{-}1 \, 1 \, \text{-}1 \, 1 \, 1 \, \text{-}1 \, \text{-}1 \, \text{-}1 \, 1 \, \text{-}1 \, \text{-}1 \, \text{-}1 \, 1 \, \text{-}1 \, 1 \\ \text{-------------------------------------} \\ \text{-}1 \, 1 \, \text{-}1 \, 1 \, 1 \, 1 \, 1 \, \text{-}1 \, 1 \, 1 \, \text{-}1 \, 1 \, \text{-}1 \, \text{-}1 \, 1 \, 1 \, \text{-}1 \, 1 \, 1 \\ \text{-------------------------------------} \end{pmatrix}$$

← ROW #1 CORRESPONDS TO RP BASIS #1 (i.e., FEATURE #1)

← ROW #j CORRESPONDS TO RP BASIS #j (i.e., FEATURE #j)

FIG. 6

$$\overset{n \times p}{(X)} = \overset{n \times q}{(A)} * \overset{q \times p}{(V)} \xrightarrow{\text{QR-VOTING HISTOGRAM}} \Big\} \begin{array}{l} n \text{ ROWS OUT OF} \\ q \text{ ROWS OF RP} \\ \text{ARE QR SELECTED} \end{array}$$

— COLUMN #q CORRESPONDS TO RP BASIS #q

— COLUMN #1 CORRESPONDS TO RP BASIS #1

} FOR EACH COLUMN OF X, n COLUMNS OUT OF q COLUMNS OF A ARE SELECTED BASED ON A SHORTEST PATH QR ALGORITHM

FIG. 7A

$q \times p$      QR-VOTING HISTOGRAM $$V = \begin{pmatrix} x \, x \, x \, x \, 0 \, x \, 0 \, x \, x \, 0 \, x \, x \, 0 \, x \, 0 \, x \, x \, 0 \\ 0 \, x \, 0 \, x \, 0 \, 0 \, x \, 0 \, x \, 0 \, 0 \, x \, x \, 0 \, x \, 0 \, 0 \, x \\ x \, 0 \, 0 \, x \, 0 \, x \, 0 \, 0 \, x \, 0 \, x \, 0 \, 0 \, x \, 0 \, x \, 0 \, 0 \\ \text{----------------------------} \\ 0 \, 0 \, 0 \, 0 \, 0 \, 0 \, 0 \, 0 \, 0 \, 0 \, 0 \, 0 \, 0 \, 0 \, 0 \, 0 \, 0 \, 0 \end{pmatrix} \begin{array}{c} 11 \\ 8 \\ 7 \\ -- \\ 0 \end{array}$$

← VOTE COUNTS FOR ROW #1 CORRESPONDS TO RP BASIS #1

← ZERO VOTES SIGNIFIES THAT RP BASIS #j IS "NON-OCCURRING" AND NOT SELECTED

FIG. 7B

| TRUTH / REFERENCE | BMP | BTR | M109 | T72 | D7 |
|---|---|---|---|---|---|
| BMP | 94.3 | 0.8 | 0 | 0 | 0.8 |
| BTR | 1.7 | 99.2 | 0 | 0 | 0 |
| M109 | 0 | 0 | 100 | 0 | 0 |
| T72 | 4 | 0 | 0 | 100 | 0 |
| REJECT (NO REFERENCE) | 0 | 0 | 0 | 0 | 99.2 |

| TRUTH / REFERENCE | BMP | BTR | M109 | T72 | UNKNOWN |
|---|---|---|---|---|---|
| BMP | 88.6 | 0.3 | 0 | 0.3 | 0.8 |
| BTR | 1.7 | 99.7 | 0 | 0.3 | 0 |
| M109 | 0.6 | 0 | 96.4 | 0 | 0 |
| T72 | 8.5 | 0 | 0 | 98.9 | 5.8 |
| REJECT (NO REFERENCE) | 0.6 | 0 | 3.6 | 0.5 | 93.4 |

# TARGET RECOGNITION SYSTEM AND METHOD WITH UNKNOWN TARGET REJECTION

BACKGROUND OF THE INVENTION

1. Field of the Invention

The present invention relates to image, and data processing systems and methods. More specifically, the present invention relates to automatic target recognition systems.

2. Description of the Related Art

Automatic target recognition systems are well known in the art. Automatic target recognizers (ATRs) use computer processing to detect and recognize target signatures typically from synthetic aperture radar (SAR) images.

Unfortunately, ATRs often detect targets that are not represented in the ATR's database. That is, these systems typically have knowledge of only a subset of targets that they encounter. Hence, in field operations, current ATRs often place unknown objects (e.g. a bulldozer) into one of a number of known target classes. This results in a high false alarm rate.

Thus, there is a need in the art for a system or method for detecting unknown targets in high resolution ATR SAR imagery. Moreover, there is a need in the art for a system and technique for detecting unknown targets in SAR ATRs that is insensitive to the nature of unknown objects.

SUMMARY OF THE INVENTION

The need in the art is addressed by the system and method of the present invention. In the illustrative embodiment the invention is an automatic target recognition system and includes an arrangement for providing a plurality of images; an arrangement for processing the images to identify one or more features thereof; an arrangement for counting each occurrence of each feature in an image as a vote; and an arrangement for using the vote to recognize a presence of an object of a particular class in the image.

In the illustrative application, the class is "unknown" and the system provides an indication of a recognition of an object of unknown classification. In the illustrative embodiment, the feature is a base signature and the arrangement for processing the images includes an arrangement for performing a random projection with respect thereto. The arrangement for counting each base signature as a vote includes an arrangement for executing a shortest path QR algorithm and the arrangement for using the vote to recognize the object class includes an arrangement for placing each vote into a histograms. The invention further includes an arrangements for performing statistical preprocessing and an arrangement for performing statistical preprocessing and rotation.

BRIEF DESCRIPTION OF THE DRAWINGS

FIG. 4 is a simplified block diagram of a method for feature selection during a training phase in accordance with an illustrative embodiment of the present teachings FIG. 5 is a simplified block diagram of a method for feature selection during an operating phase in accordance with an illustrative embodiment of the present teachings.

FIG. 6 is a diagram of the compressed matrices created by the projection of randomly generated random projection (RP) bases.

FIG. 7(a) is a diagram showing matrix operations in an illustrative implementation of a QR voting scheme in accordance with the present teachings.

FIG. 7(b) illustrates a QR voting histogram in accordance with the present teachings.

DESCRIPTION OF THE INVENTION

Figure 1A:
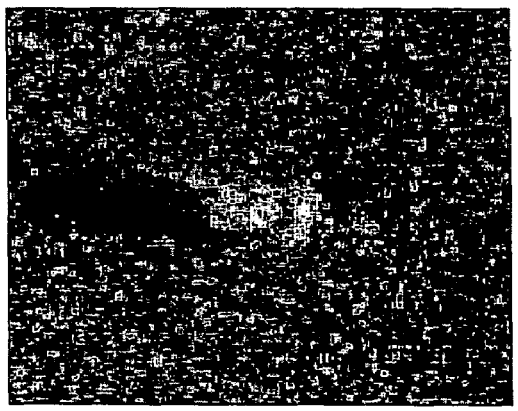
FIG. 1a is an illustrative SAR image chip of an m109 tank.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Automatic target recognition currently requires a training of the ATR prior to operation. When the number of training objects is greater than the dimensionality of an object, a dimensionality reduction method may be used. Many dimensionality reduction methods are known in the art, such as Principal Component Analysis (PCA), Singular Value Decomposition (SVD) and Discrete Cosine Transformation (DCT). See "Random Projection in Dimensionality Reduction: Applications to Image and Text Data," published by E. Bingham and H. Mannila, in *Knowledge Discovery and Data Mining*, pages 245-250 (2001).

If the number of training objects is less than the dimensionality, a technique called Random Projection (RP) can be use to extract object features for the one target class case through reduction of dimensions. See "Database-friendly Random Projections," published by Dimitris Achlioptas in *Symposium on Principles of Database Systems*, pages 274-281 (2001). Random projection has been a powerful tool to reduce the dimensionality of an object while preserving class separation. Here a class refers to a cluster of objects, which share similar features. The separation between clusters allows a given class to be separated from the other classes. The separation may be a c-separated Gaussians mixture. See "Experiments with Random Projection," published by Sanjoy Dasgupta in Proceedings of the 16th Conference on Uncertainty in Artificial Intelligence, p. 143-151, Jun. 30, 2000. Consider an object image chip having N rows and M columns and N×M dimensions. Each training object image becomes a data point in an N×M dimensional space. Typically, the number of training objects is much less than N×M, i.e., the image size. Relatively, speaking, data points may be sparsely located in a very highly dimensional, space and the base signatures of an object's class may not be easily extracted. Therefore, it may be desirable to transform data points into a feature space through reduction of dimensions.

However, to preserve the class separation distance up to a certain threshold, RP requires maintaining a minimum number of dimensions. This causes problems due to the fact that the distribution of data points in highly dimensional space is typically very sparse. To improve on this limitation on RP, the present invention extends the RP technique by introducing a novel QR voting scheme to extract features.

Hence, a system implemented in accordance with the present teachings should offer the following advantages over existing techniques: 1) an additional means to reduce RP dimensions for the sake of ATR, 2) efficacy in an, environment, i.e., unmanned, where human supervision is no longer available, and 3) an insensitivity to the nature of the objects detected.

In accordance with conventional teachings, random projection maintains a minimum number of dimensions in order to preserve a class separation distance for a given threshold T. In accordance with the present teachings, the same separation distance is preserved using fewer RP dimensions. In addition, the reduced set of RP dimensions consists of occurring RP vectors for the purpose of classifying the Known/Unknown objects. Non-occurring RP vectors are eliminated in order to reduce the false alarm rate. (An 'occurring' RP vector is defined as a nonzero projection of a given object onto to a given RP vector. A 'non-occurring' RP vector is one, which has a zero projection.) In accordance with conventional teachings, non-occurring RP features may occur in the unknown objects and thereby increase the false alarm rate of the ATR. However, the inventive QR voting scheme is designed to eliminate these non-occurring RP vectors and reduce the false alarm rate.

In short, the present invention provides a novel QR enclosing voting scheme that allows the extraction of base signatures of objects encountered by Automatic Target Recognizers. The occurrence of each base signature obtained from random projection (RP) is counted as a vote by a shortest path QR algorithm. Then, the vote is placed into a histogram for the purpose of recognizing/rejecting class of objects under consideration. FIGS. 1a and b illustrate the nature of the problem addressed by the present teachings.

FIG. 1a is an illustrative SAR image chip of an m109 tank.

Figure 1B:
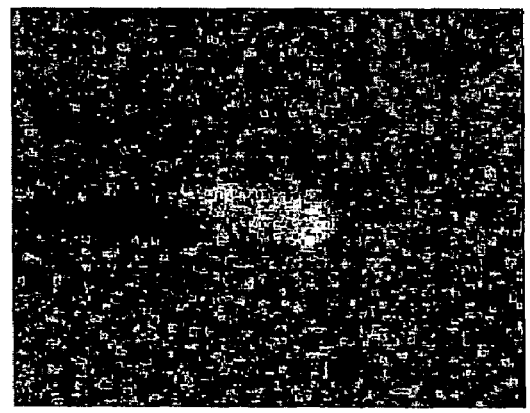
FIG. 1b is an illustrative SAR image chip of a bulldozer.

FIG. 1b is an illustrative SAR image chip of a bulldozer. Note the obvious visual similarity between the images in FIGS. 1a and 1b.

Figure 2:
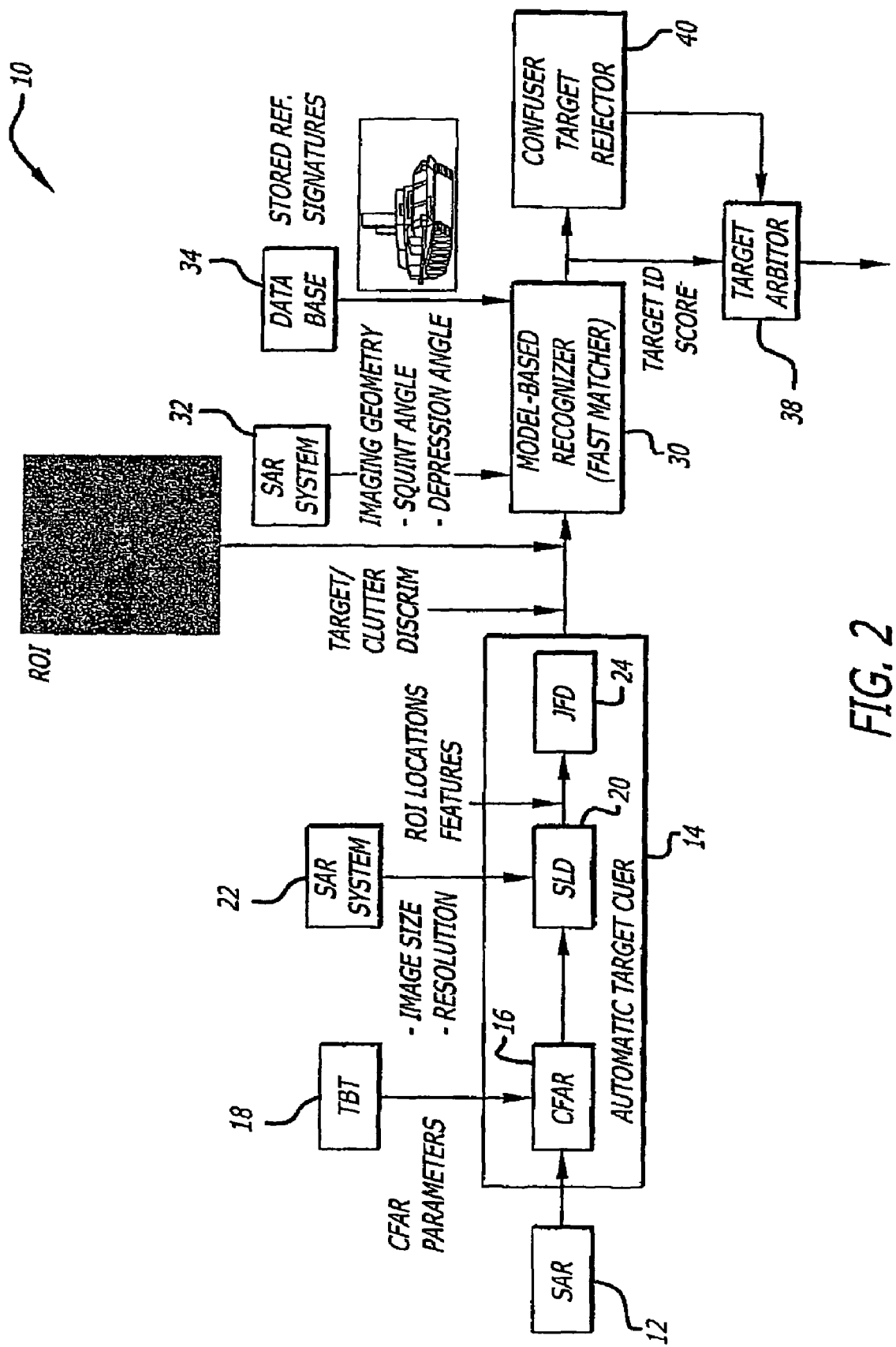
FIG. 2 is a block diagram of an illustrative embodiment of an ATR system implemented in accordance with the present teachings.

FIG. 2 is a block diagram of an illustrative embodiment of an ATR system implemented in accordance with the present teachings. The system 10 includes a synthetic aperture radar 12 which provides image chips to an automatic target cuer 14. The automatic target cuer 14 includes a constant false alarm rate (CFAR) detector 16; a second level discriminator (SLD) 20 and a joint feature-discriminator (JFD) 24.

The CFAR 16 receives CFAR parameters from a Target/Background Threshold (TBT) 18. The CFAR 16 provides detected image pixels to the SLD 20. The SLD 20 receives image size and resolution parameters from SAR sensor system 22 and outputs region of interest locations and features to the JFD 24. The JFD 24 then uses these features to discriminate target from the background clutter. The automatic target cuer 14 outputs target clutter discrimination and region of interest data to a model-based recognizer or 'Fast Matcher' 30. The recognizer 30 receives imaging geometry (e.g. squint angle, depression angle, etc.) from SAR sensor system 32 and stored reference signatures from a data base consists of known targets 34 and outputs a target ID score to a Target Arbitor 38 and a QR confuser target rejector 40 implemented in accordance with the present teachings.

The operation of the target rejector is described more fully below. The target rejector outputs an 'unknown target recognized' signal to the Target Arbitor 38 so that minimum false alarms will be made. In general, the goal is to reduce the false alarm rate, which is the declaration that a target of a specified type is present when the declaration is false. In the best mode, the target rejector 40 is implemented in software. However, recognizer 30 and the rejector 40 may be integrated without departing from the scope of the present teachings.

Figure 3:
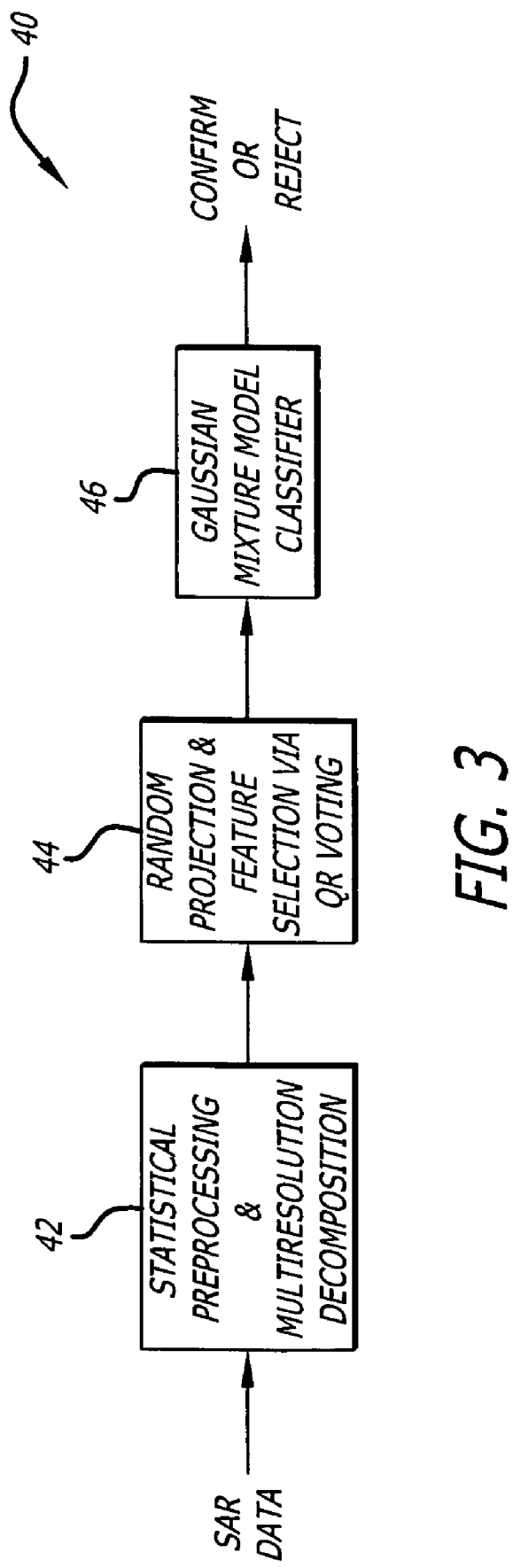
FIG. 3 is a simplified block diagram of an illustrative embodiment of the QR confuser of FIG. 2.

FIG. 3 is a simplified block diagram of an illustrative embodiment of the QR confuser of FIG. 2. As shown in FIG. 3, the target rejector 40 performs Unknown Target Rejection (UTR) and relies on the three basic components: a statistical preprocessing and multiresolution decomposition processing element 42, a random projection (RP) and feature selection via QR voting processing element 44, and a Gaussian mixture model classifier 46.

First, the preprocessor 42 uses a statistical method, commonly used with SAR data, and performs a multi-resolution decomposition to reduce processing requirements.

Next, random projection is performed by the RP element 44, providing an over-completed base, and a feature selection is performed using a novel shortest path QR voting scheme. In the preferred embodiment, the shortest path algorithm is implemented in accordance with the teachings of U.S. patent application Ser. No. 10/421,167, entitled SYSTEM AND METHOD FOR SEPARATING SIGNALS RECEIVED BY AN OVERLOADED ANTENNA ARRAY, filed Apr. 22, 2003, by Shu et al. the teachings of which are hereby incorporated by reference herein.

The training phase of the feature selection is shown and discussed more fully below with respect to FIG. 4, while the operating phase is shown and disclosed with respect to FIG. 5.

Finally, the Gaussian Mixture Model classifier 46 trains itself using these QR selected RP features from the SAR data in the training set. This results in a prototypical feature, which is the mean of the known target cluster. The standard deviation of the cluster is also computed for later use as a rejection threshold. A slightly translated and rotated version of the training set may be included during training to make the system more robust.

FIG. 4 is a simplified flow diagram of a method for training phase feature selection in accordance with an illustrative embodiment of the present teachings. As illustrated in FIG. 4, during the training phase, at step 52, statistical preprocessing and rotation are performed on region of interest data received from automatic target cuer 14 in a conventional manner using a detection angle provided by a SAR sensor suite. Next, at step 54, a Haar transform is executed on the preprocessed and rotated by a given detection angle. The transformed image is then subjected to random projection at step 56.

In accordance with the present teachings, feature selection via QR voting is executed at step 58 to provide a random QR projection matrix (RQP). This matrix is used at step 60 to compute RQP features on the transformed image. At step 62, the system trains Gaussian Mixture Mode (GMM). Finally, at step 66, class statistics are computed and a rejection threshold is provided. This rejection threshold is utilized in the operational mode as discussed more fully below.

FIG. 5 is a simplified flow diagram of a method for an operational phase of feature selection in accordance with an illustrative embodiment of the present teachings. As illustrated in FIG. 5, in the operational mode 70, at step 72, statistical preprocessing and rotation are performed as per step 52 in training mode 50. At step 74, a Haar transform is performed on the preprocessed images. At step 76, RQP features are computed using the RQP matrix provided by step 58 as per step 60 of FIG. 4. At step 78, the class statistics generated at step 66 are used to compute the GMM distance. If the computed distance is less than the rejection threshold generated at step 66, then a target of known type is declared otherwise it is rejected as unknown.

Random Projection (RP)

A system implemented in accordance with the present teachings should achieve feature selection in the RP space with over-completed bases (i.e., the number of RP bases is greater than number of training objects) and may use the following approach. Assume a training set of n images, with each image chip containing p dimensions with R rows and C columns. (i.e., p=RC) Let $x_i$ be the preprocessed $i^{th}$ image and data point $x_i=[x_{i1}, \ldots x_{ip}]$ in $R^p$, i=1:n, p>>n. Moreover, $x_i$ is the $i^{th}$ row of X, the preprocessed training set. The random projection of n data points from $R^p$ to $R^q$ requires a p×q projection matrix, where 'q' is the minimum number of dimensions required to preserve a given class separation distance. The resulting set of compressed vectors A is exhibited in FIG. 6.

FIG. 6 is a diagram of the compressed matrices created by the projection of image X onto the randomly generated random projection (RP) bases. Note that $J_{RP}^T$ is the transpose of $J_{RP}$ matrix and that $J_{RP}$ matrix may also be called an 'RP' matrix. Note also that the RP bases are generated as follows (see Achlioptas above):

Theorem 1: Given n points in $R^p$ (in form of an n×p matrix X), choose $\epsilon$, $\beta>0$ and $q>=[(4+2*\beta)/(\epsilon2/2-\epsilon3/3)] \ln(n)$, and let $A=(1/q^{1/2})XJ_{RP}$, for projection matrix $J_{RP}$. Then, mapping from X to A preserves distances up to factor $1\pm\epsilon$ for all rows in X with probability $(1-n^{-\beta})$. Projection matrix $J_{RP}$, p×q, can be constructed in one of the following ways:

$r_{ij}=\pm 1$ with probability 0.5 each  [1]

$r_{ij}=\pm 3^{1/2}*$(1 with probability ⅙ each, or 0 with probability ⅔)  [2]

Using the first of the methods suggested by Achlioptas and since we are only concerned with preserving separation between points, we do not scale our projection by $(1/q^{1/2})$.

The resulting set of compressed vectors A together with X, are used by the shortest path QR voting scheme of the present invention to select the set of "occurring" RP feature bases as shown in FIG. 7(a).

FIG. 7(a) is a diagram showing matrix operations in an illustrative implementation of a QR voting scheme in accordance with the present teachings. As discussed more fully below, the QR scheme selects n RP bases of q bases.

Let X=AV where a given column of V represents a ballot containing q candidates, each candidate corresponds to a given RP basis. Each component within a V column contains the voting weight toward a given candidate. There are a total of p ballots, one corresponds to each column of X.

Let $x^t$ be a given column vector of X corresponding to the $t^{th}$ dimension of the preprocessed training set, where t=1, 2, ..., p. A given $x^t$ represents a voter that will cast a ballot according to the QR voting scheme. The votes cast are gathered into a histogram as shown in the right hand side of FIG. 7(b).

FIG. 7(b) illustrates a QR voting histogram in accordance with the present teachings. As shown in FIG. 7(b), each row of the q×p matrix is an RP feature vector with n occurring RP bases selected out of q bases. In accordance with the present teachings, after all the p ballots are cast, the top n candidates out of q are selected via a QR voting histogram for extraction as the "occurring" RP feature bases.

In accordance with the best mode, the voting is formulated by solving the shortest path problem:

$$\min_{v^t} \sum_j |v_j^t| \qquad [3]$$

subject to $x^t=Av^t$, for $j\in\{1,2, \ldots q\}$.

In particular, by exploiting the near Laplacian distribution of base signatures in the random projection domain, the component weight of $v_j^t$ can be assumed to achieve sparsity where the term "sparse" refers to the fact that under such a distribution the $l_1$ norm $\Sigma_{jt}|v_j^t|$ of the components is minimized, therefore maximizing the number of voting components which are zero. Thus, sparsity here means that only a small number of components in the voting domain differ significantly from zero due to projections are random, thus most projections are "non-occurring" RP feature bases. There are at most n components different from zero because of n training images.

Shortest Path QR Voting Scheme

After successfully mapping from X to A by random projection, we are ready to VOTE as follows. Since the system in equation [1] is under-determined (q>>n), its solution is not unique when given the compressed A matrix. The sparse approach to the under-determined case consists in finding the solution that minimizes the $l_1$ norm, as in equation [1], yielding the optimal sparse decomposition. From the point of view of RP space, the $l_1$ norm formulation has a geometrical meaning as shown in FIG. 8 (here, the 2-D is for illustration only). That is, the decomposition of a given data point $x^t$ consists of searching a path from the origin "O" to that point $x^t$ constrained by the available directions/columns in the compressed matrix A. The components of $v^t$ are then the lengths of the resulting path along each direction. In this sense, the solution that optimizes sparsity corresponds to the shortest path, and has at most n components different from zero.

Figure 8A:
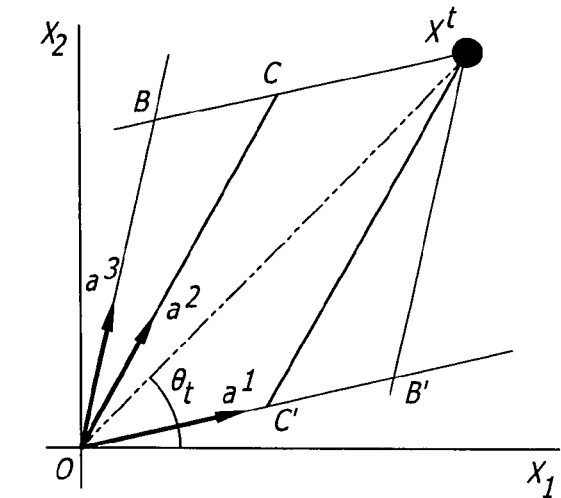
FIG. 8a is a diagram illustrating a search for directions enclosing data points in the two-dimensional case in accordance with the present teachings.

FIG. 8a is a diagram illustrating a search for directions enclosing data points in the two-dimensional case (n=2) in accordance with the present teachings. In FIG. 8, $\perp x^t: x^t$ projection onto $a^2$ $\perp a^1: a^1$ projection onto $a^2$ We search for the shortest path using both a clockwise and a counter-clockwise search method and equation [3]. As shown in FIG. 8a, for the 2-D case, the shortest path to data point $x^t$ is defined by the two directions that enclose $\theta^t$. This is due to the fact that taking any other direction would imply getting further away from the goal. For example, $a^3$ is closer to $x^t$ than $a^1$ to $x^t$, but it will take the path O-C further away from $x^t$. Here, O-C-$x^t$ (or O-C'-$x^t$) is the shortest path where O-C and C-$x^t$ correspond to $a^2$ and $a^1$, respectively. Thus, while each is one of then column vectors in A, $a^1$ and $a^2$ are the enclosing directions, where $a^1$ is closer (clockwise search) and below $\theta^t$ and, likewise, $a^2$ is the closest direction from above (counter-clockwise search).

Now, letting $W_r=[a^1 \ a^2]^{-1}$ be the reduced N×N inverse matrix (N=2), and $v_r^t$ be the reduced decomposition along directions $a^1$ and $a^2$.

The components of the votes are then obtained as:

$$v_r^t = W_r X^t, \quad [4]$$

$$v_j^t = 0, \text{ for } j \neq 1, 2. \quad [5]$$

Before we generalize the 2-D case to higher dimensions, we introduce a half-plane enclosing search algorithm, rather than employing a clockwise search as before. This kind of 2-D half-plane search can easily be extended to a half-space search suitable for the higher dimensions (3-D and above).

Figure 8B:
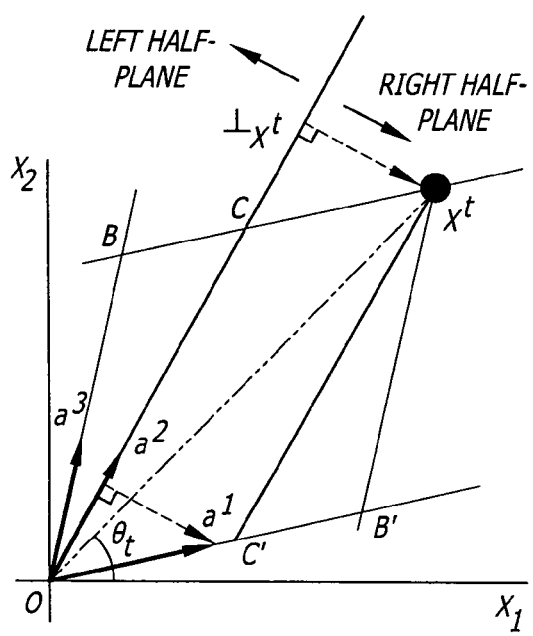
FIG. 8b is a diagram illustrating a half-plane search for directions enclosing data points in the two-dimensional case in accordance with the present teachings.

FIG. 8b is a diagram illustrating a half-plane search for directions enclosing data points in the two-dimensional case (n=2) in accordance with the present teachings. As shown in FIG. 8b, the half-plane search method starts by finding the closest compressed direction $a^2$ to $X^t$. The result is a line containing $a^2$ which partitions a 2-D plane into two half-planes. Next, the method searches for the closest compressed direction $a^1$ to $X^t$ such that $a^1$ resides on the same half-plane as $X^t$. In this particular illustration, $a^3$ resides on the opposite side of the half-plane containing $X^t$ and it is disqualified. Finally, $a^1$ and $a^2$ enclose $X^t$ most tightly. To verify that $a^1$ and $X^t$ reside on the same half-plane, the following enclosing condition has to be satisfied:

$$(x^t - {}^\perp x^t)'*(a^1 - {}^\perp a^1) > 0 \quad [6]$$

where ${}^\perp x^t$ denotes $x^t$ projection onto $a^2$ and ${}^\perp a^1$ a denotes $a^1$ projection onto $a^2$.

To extend this enclosing condition to the higher dimension n, at each step of finding the next closest, compressed direction, these projections need to be modified. Instead of a projection onto one direction $a^2$, these projections would be done onto the subspace spanned by the set of closest compressed directions identified by all previous steps. This set, called "W," forms a hyper-plane that partitions an n-dimensional space into two half-spaces. It is this W matrix that provides the foundation for developing a novel QR enclosing method in accordance with the present teachings to decompose a higher dimensional data point $x^t$.

Figure 9:
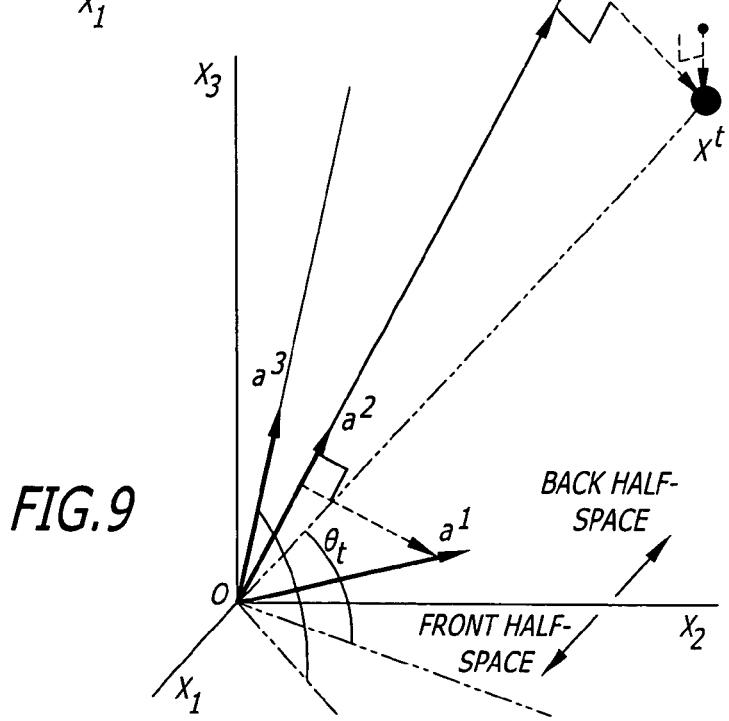
FIG. 9 is a diagram that illustrates the steps needed to perform a QR decomposition search of the directions enclosing $X^t$ the n-Dimensional case in accordance with an illustrative embodiment of the present teachings.

FIG. 9 is a diagram which illustrates the steps needed to perform a QR decomposition search of the directions enclosing $X^t$ in the n-Dimensional case (n>2) in accordance with an illustrative embodiment of the present teachings. In FIG. 9, $$a^3 \text{ and } x^t$$

are projections onto w subspace formed by previously calculated enclosing mixing directions.

The QR enclosing algorithm starts by finding the closest compressed direction $a^2$ to $X^t$. Letting $w_1$ be the $a^2$, where $w_1$ is the first column of matrix W which is used by the QR decomposition, then, at the second step, we search for the next closest direction $w_2 = a^1$ from $X^t$ such that $(x^t - {}^\perp x^t)'*(a^1 - {}^\perp a^1) > 0$. As a result, $w=[w_1 \ w_2]$ forms the hyper-plane that partitions a n-Dimensional space into two half-spaces.

In this particular illustration, the hyper-plane made of $a^1$ and $a^2$ is coplanar with that of $X_2$ and $X_3$, and the same front half-space contains both $a^3$ and $X^t$. Thus $w_3 = a^3$ is qualified as the third closest direction to $X^t$. To verify that $a^3$ and $X^t$ reside on the same half-space, the following enclosing condition has to be satisfied:

$$(x^t - {}^\perp x^t)'*(a^3 - {}^\perp a^3) > 0 \quad [7]$$

where ${}^\perp x^t$ denotes $x^t$ projection onto w and ${}^\perp a^3$ denotes $a^3$ projection onto w.

To extend this enclosing condition to step k, where k≦n, QR factorization of w is employed to compute $x^t$ projection onto w as follows. Let $$w=[w_1 \ldots w_{k-1}]=QR, \quad [8]$$

then $${}^\perp x^t = Q^*(Q'^* x^t); \quad [9]$$

$${}^\perp a^j = Q^*(Q'^* a^j); \quad [10]$$

where ${}^\perp a^j$ denotes $a^j$ projection onto w, and $w_k = a^j$ is the $k^{th}$ closest direction from $X^t$ such that:

$$(x^t - {}^\perp x^t)'*(a^j - {}^\perp a^j) > 0 \quad [11]$$

Finally, when QR has been used to constrain the search and find all the minimum enclosing compressed directions in n-space, we can then estimate the voting components through the shortest path. Let $W_r = [w_1 \ldots w_n]^{-1}$ be the reduced n×n inverse matrix and let $v_r^t$ be the reduced decomposition along directions $w_1 \ldots w_n$. The components of the votes are then obtained as:

$$v_r^t = W_r x^t, \quad [12]$$

$$v_j^t = 0, \text{ for } j > n. \quad [13]$$

Resulting magnitudes of components of the votes are then compared with a threshold and the passing votes are placed into a histogram for the purpose of selecting bases for recognizing/rejecting class of objects under consideration. The lower right corner of FIG. 7(b) shows these counts of the QR voting histogram.

As mentioned previously, the training phase of the feature selection is diagrammed in FIG. 4, while the operation, phase is shown in FIG. 5.

Figures 10, 11, 12:
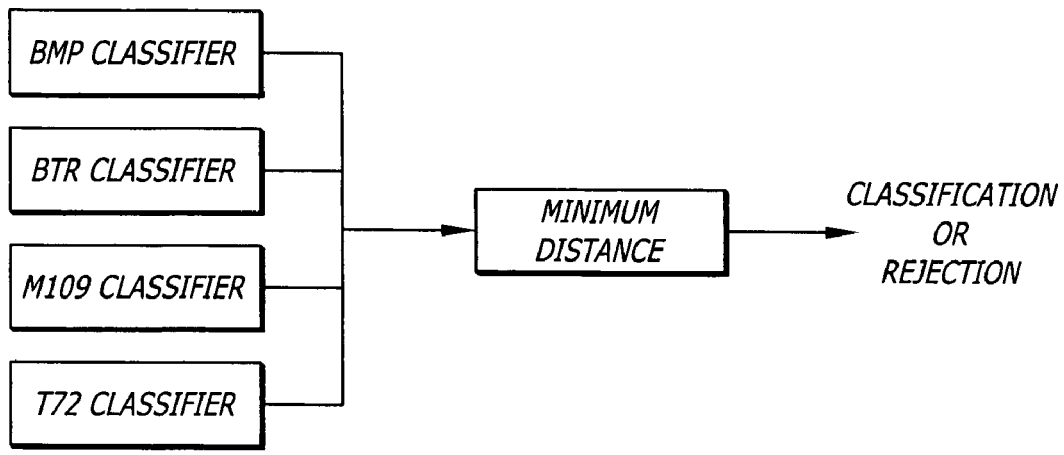
FIG. 10 is a block diagram of an illustrative implementation of a multi-class classifier in accordance with the present teachings.
FIG. 11 is a table showing results from four-class operation in accordance with an illustrative embodiment of the present teachings.
FIG. 12 is a table showing results from four-class operation with translation tolerance in accordance with an illustrative embodiment of the present teachings.

FIG. 10 is a block diagram of an illustrative implementation of a multi-class classifier in accordance with the present teachings. By operating all four classifiers in parallel and selecting the minimum distance, we can construct a standard ATR classifier with a standard confusion matrix. The results from Four-Class operation are exhibited in FIG. 11 and the results from translation tolerance are shown in FIG. 12. The confusion matrix as shown in FIG. 11 contains the truth about the objects as shown on the top row axis, while the computed class is shown on the column axis. For example, the data in the first column represents that the object is truly BMP, however, after using our algorithm, there is 94.3% of probability that it will be classified as BMP as well as 1.7%, 0%, 4%, and 0% as BTR, M109, T72 and Reject, respectively.

Finally, FIG. 12 is an illustrative table that tabulates the performance of the invention with respect to a translation in the image. Included are shifts of 1-4 pixels in our training set. The results demonstrate that while our algorithm is not completely intolerant of translation, performance does not decline dramatically.

Therefore, the present teachings provide a method that uses real training data (i.e, not synthetic, but real SAR data gathered by an aircraft) to provide a very low false alarm rate for unknown targets in the four class ATR application with low computation and memory requirements.

Thus, the present invention has been described herein with reference to a particular embodiment for a particular application. Those having ordinary skill in the art and access to the present teachings will recognize additional modifications applications and embodiments within the scope thereof. For example, in the best mode, the present teachings are implemented in software stored on a medium and executed by a processor. However, those skilled in the art will appreciate that the present teachings may be implemented in hardware without departing from the scope of the invention.

It is therefore intended by the appended claims to cover any and all such applications, modifications and embodiments within the scope of the present invention.

Accordingly,

What is claimed is:

1. An automatic target recognition system comprising:
   means for providing a plurality of images;
   means for processing said images to identify one or more features thereof said means for processing said images including means for performing a random projection with respect thereto;
   means for counting each occurrence of each feature in an image as a vote, at least one of said features being a base signature, said means for counting each feature as a vote further including means for executing a shortest path QR algorithm; and
   means for using said vote to recognize a presence of an object of a particular class in said image.

2. The invention of claim 1 wherein said class is "unknown".

3. The invention of claim 1 wherein said means for using said vote to recognize an object of a particular class includes means for placing each vote into a histogram.

4. The invention of claim 1 further including means for performing statistical preprocessing.

5. The invention of claim 4 further including means for performing statistical preprocessing and rotation.

6. The invention of claim 4 further including means for performing multiresolution decomposition.

7. The invention of claim 4 further including means for providing a Haar transform of the output of said means for performing statistical preprocessing.

8. The invention of claim 7 further including means for computing a rejection threshold.

9. The invention of claim 8 wherein said means for computing a rejection threshold includes means for computing an RQP matrix.

10. The invention of claim 9 wherein said means for computing an RQP matrix includes means for performing random projection on said Haar transform.

11. The invention of claim 10 wherein said means for computing an RQP matrix includes means for effecting a feature selection using QR voting.

12. The invention of claim 9 wherein said means for computing a rejection threshold includes means for computing RQP features.

13. The invention of claim 12 wherein said means for computing a rejection threshold includes means for training a Gaussian Mixture Model.

14. The invention of claim 13 wherein said means for computing a rejection threshold includes means for computing class statistics.

15. The invention of claim 1 further including means for computing a Gaussian Mixture Model distance.

16. The invention of claim 1 further including a Gaussian mixture model classifier.

17. The invention of claim 1 wherein the vote is formulated by solving the shortest path problem $$: \min_{v^t} \sum_j |v_j^t|$$

subject to $x^t = AV^t$ for $j \in \{1, 2, \ldots, q\}$, where $v_j^t$ is component weight of index j, $x^t$ is a data point in a given column vector of an image matrix X corresponding to the $t^{th}$ dimension of the preprocessed training set, where t=1, 2, ..., p, where p is a number of ballots, A is a compressed matrix mapped by random projection, V is matrix of voting weights and q is the minimum number of dimensions required to preserve a given class separation distance.

18. The invention of claim 17 wherein the components of the votes are $v_r^t = W_r x^t$ and $v_j^t = 0$ for $j \neq 1, 2$; where $W_r = [a^1 \ a^2]^{-1}$ is the reduced N×N inverse matrix (N=2), and $v_r^t$ is the reduced decomposition along directions $a^1$ and $a^2$.

19. A synthetic aperture radar system adapted to provide a plurality of images and having an automatic target recognition system, said automatic target recognition system comprising:
   a processor;
   code stored on a medium and adapted to be executed by said processor to:
      process said images to identify one or more features thereof, at least one of said features being a base signature, wherein said code for processing said images includes code for performing a random projection with respect thereto;
      count each occurrence of each feature in an image as a vote, wherein said code for counting each occurrence of each feature as a vote includes code for executing a shortest path QR algorithm; and
      use said vote to recognize an object of an unknown class in said image.

20. The invention of claim 19 wherein said code for using said vote to recognize said object class includes code for placing each vote into a histogram.

21. The invention of claim 19 further including code for performing statistical preprocessing.

22. The invention of claim 21 further including code for performing statistical preprocessing and rotation.

23. The invention of claim 21 further including code for performing multiresolution decomposition.

24. The invention of claim 21 further including code for providing a Haar transform of the output of said code for performing statistical preprocessing.

25. The invention of claim 24 further including code for computing a rejection threshold.

26. The invention of claim 25 wherein said code for computing a rejection threshold includes code for computing an RQP matrix.

27. The invention of claim 26 wherein said code for computing an RQP matrix includes code for performing random projection on said Haar transform.

28. The invention of claim 27 wherein said code for computing an RQP matrix includes code for effecting a feature selection using QR voting.

29. The invention of claim 26 wherein said code for computing a rejection threshold includes code for computing RQP features.

30. The invention of claim 29 wherein said code for computing a rejection threshold includes code for training a Gaussian Mixture Model.

31. The invention of claim 30 wherein said code for computing a rejection threshold includes code for computing class statistics.

32. The invention of claim 19 further including code for computing a Gaussian Mixture Model distance.

33. The invention of claim 19 further including a Gaussian mixture model classifier.

34. The invention of claim 19 wherein the vote is formulated by solving the shortest path problem:

$$:\min_{v^t} \sum_j |v_j^t|$$

subject to $x^t = A v^t$ for $j \in \{1,2,\ldots,q\}$, where $v_j^t$ is a component weight of index j, $x^t$ is a data point in a given column vector of an image matrix X corresponding to the $t^{th}$ dimension of the preprocessed training set, where $t=1, 2, \ldots, p$, where is a number of ballots, A is a compressed matrix mapped by random projection, V is matrix of voting weights and q is the minimum number of dimensions required to preserve a given class separation distance.

35. The invention of claim 34 wherein the components of the votes are $v_r^t = W_r x^t$ and $v_j^t = 0$ for $j \neq 1,2$; where $W_r = [a^1\ a^2]^{-1}$ is the reduced N×N inverse matrix (N=2), and $v_r^t$ reduced decomposition along directions $a^1$ and $a^2$.

36. A method for automatic target recognition including the steps of:
providing a plurality of images;
processing said images to identify one or more features thereof, at least one of said features being a base signature, wherein said code for processing said images includes code for performing a random projection with respect thereto;
using a shortest path QR algorithm to count each occurrence of each feature in an image as a vote; and
using said vote to recognize a presence of an object of a particular class in said image.

37. The invention of claim 36 wherein the vote is formulated by solving the shortest path problem:

$$:\min_{v^t} \sum_j |v_j^t|$$

subject to $x^t = A v^t$ for $j \in \{1,2,\ldots,q\}$, where $v_j^t$ is a component weight of index j, $x^t$ is a point in a given column vector of an image matrix X corresponding to the $t^{th}$ dimension of the preprocessed training set, where $t=1, 2, \ldots, p$, where p is a number of ballots, A is a compressed matrix mapped by random projection, V is matrix of voting weights and q is the minimum number of dimensions required to preserve a given class separation distance.

38. The invention of claim 37 wherein the components of the votes are $v_r^t = W_r x^t$ and $v_j^t = 0$ for $j \neq 1, 2$; where $W_r = [a^1\ a^2]^{-1}$ is the reduced N×N inverse matrix (N=2), and $v_r^t$ is the reduced decomposition along directions $a^1$ and $a^2$.

\* \* \* \* \*